(12) United States Patent
Morita

(10) Patent No.: US 9,372,985 B2
(45) Date of Patent: Jun. 21, 2016

(54) INFORMATION PROCESSING DEVICE, INFORMATION PROCESSING METHOD, AND COMPUTER PROGRAM

(71) Applicant: Sony Corporation, Tokyo (JP)

(72) Inventor: Tadashi Morita, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/372,900

(22) PCT Filed: Dec. 25, 2012

(86) PCT No.: PCT/JP2012/083434
§ 371 (c)(1),
(2) Date: Jul. 17, 2014

(87) PCT Pub. No.: WO2013/111490
PCT Pub. Date: Aug. 1, 2013

(65) Prior Publication Data
US 2015/0242617 A1   Aug. 27, 2015

(30) Foreign Application Priority Data

Jan. 25, 2012 (JP) ................. 2012-012842

(51) Int. Cl.
*G06F 21/44* (2013.01)
*G06F 9/44* (2006.01)
*G06F 21/52* (2013.01)

(52) U.S. Cl.
CPC .............. *G06F 21/445* (2013.01); *G06F 8/311* (2013.01); *G06F 8/312* (2013.01); *G06F 21/52* (2013.01); *G06F 2221/033* (2013.01); *G06F 2221/2153* (2013.01)

(58) Field of Classification Search
CPC . H04L 63/123; H04L 63/205; H04L 63/0853; H04L 9/32; G06F 21/52; G06F 21/445
USPC ............................................................. 726/4
See application file for complete search history.

(56) References Cited

U.S. PATENT DOCUMENTS

| 5,826,088 A | 10/1998 | Sitbon et al. |
| 6,308,317 B1 | 10/2001 | Wilkinson et al. |
| 7,117,485 B2 | 10/2006 | Wilkinson et al. |

(Continued)

FOREIGN PATENT DOCUMENTS

| JP | 09-212356 A | 8/1997 |
| JP | 2000-514584 A | 10/2000 |

(Continued)

OTHER PUBLICATIONS

International Search Report from International Publication No. PCT/JP2012/083434 mailed Mar. 19, 2013.

*Primary Examiner* — Hadi Armouche
*Assistant Examiner* — Shahriar Zarrineh
(74) *Attorney, Agent, or Firm* — Lerner, David, Littenberg, Krumholz & Mentlik, LLP

(57) ABSTRACT

There is provided an information processing device including a first program execution unit that loads, interprets, and executes code of a computer program created by a procedural language. The program execution unit includes at least one port, and via this port, executes a second computer program created by a procedural language executed by a second program execution unit after authenticating with the second program execution unit.

5 Claims, 9 Drawing Sheets

(56) References Cited

U.S. PATENT DOCUMENTS

| | | | |
|---|---|---|---|
| 7,818,727 B2 | 10/2010 | Wilkinson et al. | |
| 8,042,151 B2 * | 10/2011 | Olsen et al. | 726/2 |
| 8,516,458 B2 | 8/2013 | Stewart et al. | |
| 8,646,060 B1 * | 2/2014 | Ben Ayed | H04L 63/0853 726/9 |
| 8,726,247 B2 | 5/2014 | Wilkinson et al. | |
| 2002/0026503 A1 * | 2/2002 | Bendinelli et al. | 709/220 |
| 2002/0091826 A1 * | 7/2002 | Comeau et al. | 709/226 |
| 2003/0126453 A1 * | 7/2003 | Glew et al. | 713/193 |
| 2003/0159044 A1 * | 8/2003 | Doyle et al. | 713/176 |
| 2005/0125668 A1 * | 6/2005 | Botz | G06F 21/31 713/171 |
| 2005/0198517 A1 * | 9/2005 | Ivanov et al. | 713/187 |
| 2006/0218196 A1 | 9/2006 | Kurita | |
| 2007/0074023 A1 * | 3/2007 | Lucidarme | 713/169 |
| 2009/0164785 A1 * | 6/2009 | Metke | H04L 9/3273 713/169 |
| 2010/0332820 A1 * | 12/2010 | Matsushima et al. | 713/150 |
| 2011/0161734 A1 * | 6/2011 | Alexander et al. | 714/16 |
| 2012/0254843 A1 | 10/2012 | Wilkinson et al. | |
| 2012/0254844 A1 | 10/2012 | Wilkinson et al. | |

FOREIGN PATENT DOCUMENTS

| | | |
|---|---|---|
| JP | 2001-283160 A | 10/2001 |
| JP | 2011-513824 A | 4/2011 |
| WO | 2005/121976 A1 | 12/2005 |

* cited by examiner

- NAME (pname) — 401
- VARIABLE DEFINITION (value) — 402
- FUNCTION DEFINITION (function) — 403
- SECURITY ATTRIBUTE — 404

400

410

| 411 | 412 |
|---|---|
| car0 | cdr0 |
| car1 | cdr1 |
| car2 | cdr2 |
| car3 | cdr3 |
| car4 | cdr4 |
| car5 | cdr5 |
| car6 | cdr6 |
| car7 | cdr7 |
| car8 | cdr8 |
| car9 | cdr9 |

INFORMATION PROCESSING DEVICE, INFORMATION PROCESSING METHOD, AND COMPUTER PROGRAM

CROSS-REFERENCE TO RELATED APPLICATION

The present application is a national phase entry under 35 U.S.C. §371 of International Application No. PCT/JP2012/083434 filed Dec. 25, 2012, published on Aug. 1, 2013 as WO 2013/111490 A1, which claims priority from Japanese Patent Application No. JP 2012-012842, filed in the Japanese Patent Office on Jan. 25, 2012.

TECHNICAL FIELD

The present disclosure relates to an information processing device, an information processing method, and a computer program.

BACKGROUND ART

In procedural programming languages such as LISP, Ruby, and Python, variables and function definition information is loaded at program runtime, and the program is executed on the basis of the loaded function definitions and variable values. Software that interprets and executes such a procedural programming language (a sequential execution data processing module) loads an application program stated in a procedural programming language every time the software is activated, and thereafter processes input data and outputs a processing result according to the loaded application program.

A characteristic of software that interprets and executes a procedural programming language is that if a defined variable name is input, the content of that variable may be read out. Likewise, if a function that reads out a defined function is input, that function code may be output.

In the past, computer system architecture involved breaking down the requested specifications into function modules for individual tasks, defining the module control instructions and communication means from the start, and using a compiler to realize the construction. In function module development, the behavior of a module is defined from the start using programming code in the function module or by using a predefined code, which undergoes a sequence of compiling, linking, and debugging before being incorporated into the system.

CITATION LIST

Patent Literature

Patent Literature 1: JP 2011-513824T
Patent Literature 2: WO 2005/121976

SUMMARY OF INVENTION

Technical Problem

In computer system architecture of the related art, the properties, communication means, and instruction format of a function module to be generated are all decided individually, and debugging and correction is time-consuming. For example, even in the case of development that divides data processing responsibility into multiple function modules and utilizes communication via a network, changing the behavior of each function module requires reprogramming as well as a careful implementation of module security, making it difficult to lower development costs.

Furthermore, implementing a security function in a function module may in some cases involve maintaining security by keeping that module's code a secret, but there is a problem in that an authentication process is not executed between separate, independently executed, sequential execution data processing modules, and many people involved with code changes are able to learn the code, making it difficult to ensure security.

Accordingly, the present disclosure has been devised in light of the foregoing problems, and an object of the present disclosure is to provide a new and improved information processing device, an information processing method, and a computer program able to safely link separate, independently executed, sequential execution data processing modules.

Solution to Problem

According to the present disclosure, there is provided an information processing device including a first program execution unit that loads, interprets, and executes code of a computer program created by a procedural language. The first program execution unit includes at least one port, and via this port, executes a second computer program created by a procedural language executed by a second program execution unit after authenticating with the second program execution unit.

Further, according to the present disclosure, there is provided an information processing method including loading, interpreting, and executing code of a computer program created by a procedural language, by a first program execution unit that includes at least one port. The executing executes, via the port and by the first program execution unit, a second computer program created by a procedural language executed by a second program execution unit after authenticating with the second program execution unit.

Further, according to the present disclosure, there is provided a computer program causing a computer to execute loading, interpreting, and executing code of a computer program created by a procedural language, by a first program execution unit that includes at least one port. The executing executes, via the port and by the first program execution unit, a second computer program created by a procedural language executed by a second program execution unit after authenticating with the second program execution unit.

Advantageous Effects of Invention

According to the present disclosure as described above, it is possible to provide a new and improved information processing device, an information processing method, and a computer program able to safely link separate, independently executed, sequential execution data processing modules.

DESCRIPTION OF EMBODIMENTS

Figure 1:
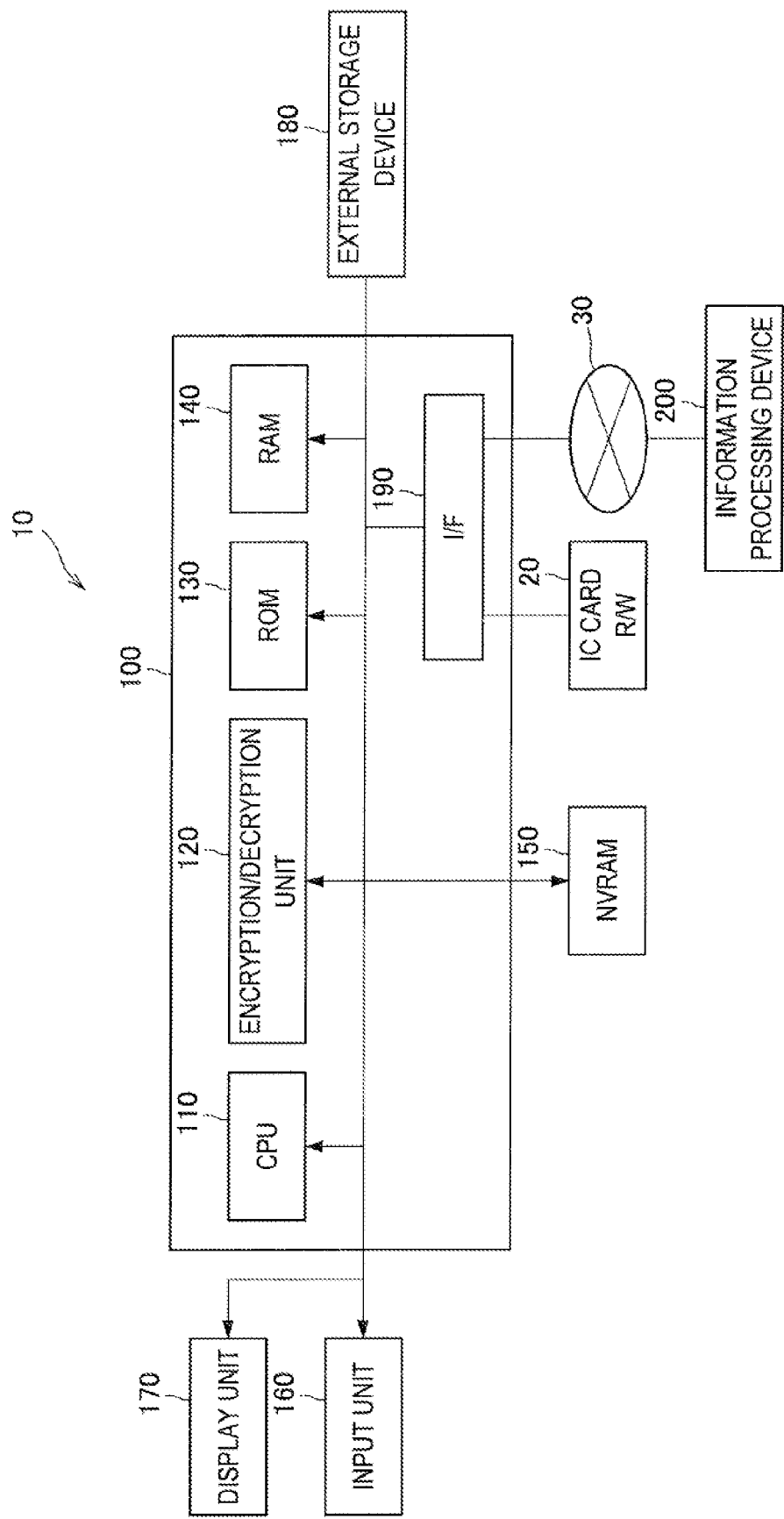
FIG. 1 is an explanatory diagram illustrating a functional configuration of an information processing system 10 according to an embodiment of the present disclosure.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Hereinafter, the description will proceed in the following order.

<1. Related art and problems thereof>
<2. Embodiment of present disclosure>
[Functional configuration of information processing system]
[Program structure examples]
[Use case examples]
<3. Conclusion>

1. Related Art and Problems Thereof

First, before describing a preferred embodiment of the present disclosure in detail, the related art of the present disclosure and the problems thereof will be described. As discussed earlier, in previous computer system architecture, the requested specifications are broken down into function modules for individual tasks, the module control instructions and communication means are defined from the start, and by compiling using a compiler, the architecture of the system is realized. In function module development, the behavior of a function module is defined from the start using programming code in the function module, or alternatively, by using a predefined code, which undergoes a sequence of compiling, linking, and debugging before being incorporated into the system.

For a function module generated at this point, the properties, communication means, and instruction format are individually decided, thus requiring similar test to be conducted over and over, and debugging and correction of the system is time-consuming.

In addition, even in the case of development according to a scheme that divides into multiple execution modules and communicates via a network, changing the behavior of each function module must start from reprogramming. Furthermore, when implementing a security function discussed later in an execution module, it is necessary to carefully implement that security function. Thus, there is a problem in that development costs are hardly lowered.

Also, when incorporating a security function, in some cases security is maintained by keeping that code a secret, but there is a problem in that, in the case in which code correction is necessary, many developers involved with changes to that execution module will learn information about the security function.

In recent years, mechanisms that improve these problems using a scripting language are being created. However, loading a script is realized by using a keyboard to load a file recorded on a hard disk or the like provided in the system, and a script processing module with functions for safely loading a script over a network and safely linking multiple data processing modules did not exist.

There does exist a system that executes code realized by a script processing module that executes a script, and coordinates operation while conducting network communication, but an advanced, remotely controllable script processing module, such as one that connects to a network and builds a script program for another script processing module at the other end of a connection via the connected network, did not exist, and safely making changes to a program remotely was not possible.

Using a compiled language to build an architecture enabling the behavior of one execution module to be freely changed by simply changing an initialization file tended to produce defects, such as increased redundancy and waste, and a lack of required components. Additionally, when developing a secure application, in the case of desiring to maintain compatibility while also concealing a mutual authentication or other security algorithm, it was necessary to disclose that security algorithm as many times as there are applications, making it difficult to keep security high.

Accordingly, the preferred embodiment of the present disclosure described hereinafter illustrates a sequential execution data processing module able to expand the functionality of a sequential execution data processing module, and execute a transaction with distributed responsibility by distributing the transaction across multiple modules while also executing an authentication process among those modules.

2. Embodiment of Present Disclosure

Functional Configuration of Information Processing System

First, a functional configuration of an information processing system according to an embodiment of the present disclosure will be described. FIG. 1 is an explanatory diagram illustrating a functional configuration of an information processing system 10 according to an embodiment of the present disclosure. Hereinafter, FIG. 1 will be used to describe a functional configuration of the information processing system 10 according to an embodiment of the present disclosure.

As illustrated in FIG. 1, the information processing system 10 according to an embodiment of the present disclosure includes an information processing device 100 that executes a program, non-volatile random access memory (NVRAM) 150, an input unit 160, a display unit 170, an external storage device 180, and an interface (I/F) 190.

The information processing device 100 is configured to be able to interpret and execute a procedural programming language. Such a programming language may be LISP, Scheme, Ruby, or Python, for example.

As illustrated in FIG. 1, the information processing device 100 includes a central processing unit (CPU) 110, an encryption/decryption unit 120, ROM 130, and RAM 140.

The CPU 110 controls the operation of the information processing device 100, and by executing a readout instruction for operating system software prerecorded in the ROM 130, is able to execute that operating system. When executing the operating system, the CPU 110 may use the RAM 140 as a work area. Herein, the operating system recorded in the ROM 130 is able to interpret and execute a procedural programming language as discussed earlier, for example. Note that in the present disclosure, a procedural program may also be loaded and executed from the external storage device 180.

A program loaded from the ROM 130 of the information processing device 100 according to the present embodiment a basic function of the above procedural programming language processed via an interpreter, in addition to a security function. As a result, when installing an application program on the information processing device 100, compiling in advance is not necessary, and moreover is security function is added, making it possible to debug the application with the information processing device 100 itself. Consequently, this leads to a shortening of the development step, enabling the development of an application program over a short period.

The encryption/decryption unit 120 performs an encryption process using a specified key on input data and outputs, and performs a decryption process using a specified key on input encrypted data and outputs. In the present embodiment, source code is encrypted when saving source code to the external storage device 180, and decrypts source code that is stored in the external storage device 180 in an encrypted state. Keys used by the encryption/decryption unit 120 to encrypt and decrypt source code are stored in the NVRAM 150.

The input unit 160 is connected to the information processing device 100, and receives a user's input operation with respect to the information processing device 100. The input unit 160 made be made up of a keyboard, mouse, touch panel, or the like, for example. The display unit 170 is connected to the information processing device 100, and displays an information processing result from the CPU 110 of the information processing device 100 on the basis of a process of the CPU 110. The display unit 170 may be made up of a liquid crystal display, an organic EL display, or other flat panel display device, for example.

The external storage device 180 is connected to the information processing device 100, and stores various data used by the information processing device 100. The display unit 170 may be made up of a hard disk, for example.

In the present embodiment, the external storage device 180 stores a sequential execution data processing module able to interpret and execute a procedural programming language (hereinafter also designated the "list processing module"), and source code that is loaded and executed by the sequential execution data processing module. This source code is stored in a state of being encrypted by the encryption/decryption unit 120. Storing source code in a state of being encrypted by the encryption/decryption unit 120 enables higher confidentiality of the source code.

The interface 190 is an interface for connecting the information processing device 100 to other devices and equipment, and is made up of a serial interface, an parallel interface, and the like, for example. FIG. 1 illustrates a state of the information processing device 100 being connected via the interface 190 to an IC card reader/writer 20 and an information processing device 200 connected to a network 30.

In the present embodiment, the information processing device 200 also includes a configuration similar to the configuration of the information processing device 100 illustrated in FIG. 1, and a list processing module is able to load source code and execute a script.

Note that in FIG. 1, the NVRAM 150, the input unit 160, and the display unit 170 as illustrated as being provided externally to the information processing device 100, but the present disclosure is not limited to such an example. In other words, at least one of the NVRAM 150, the input unit 160, and the display unit 170 may also include a configuration provided internally to the information processing device 100. The foregoing thus uses FIG. 1 to describe a hardware configuration of the information processing device 100 according to an embodiment of the present invention. Next, a structure of a computer program executed by the information processing device 100 illustrated in FIG. 1 will be described.

Program Structure Examples

FIGS. 2 to 5 are explanatory diagrams illustrating an exemplary structure of a computer program executed by an information processing device 100 according to an embodiment of the present invention. Hereinafter, FIGS. 2 to 5 will be used to describe an exemplary structure of a computer program executed by an information processing device 100 according to an embodiment of the present invention.

Note that in the following description, unless specifically stated otherwise, LISP is presupposed to be the language of the computer program executed by the information processing device 100. However, in the present disclosure, the language usable as the programming language is not limited to such an example, and any procedural programming language may be used insofar as the language may be configured such that, in an extended function or a standard function, security may be configured independently per variable and per function.

Figures 2, 3:
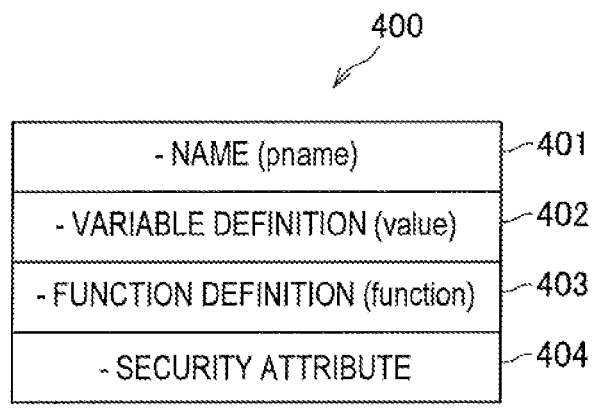
FIG. 2 is an explanatory diagram illustrating an exemplary structure of a computer program executed by an information processing device 100 according to an embodiment of the present invention.
FIG. 3 is an explanatory diagram illustrating an exemplary structure of a computer program executed by an information processing device 100 according to an embodiment of the present invention.

The CPU 120, when executing a computer program, loads a list processing module for interpreting and executing the source code of a program developed by the information processing device 100 and installed on the information processing device 100. FIG. 2 is an explanatory diagram illustrating a data structure called a symbol that may be defined by the list processing module.

As illustrated in FIG. 2, a symbol 400 that may be defined by the list processing module is made up of a name area 401, a variable definition area 402, a function definition area 403, and a security attribute area 404.

The name area 401 points to a printable character table. The name area 401 stores the variable name if that symbol defines a variable, and stores the function name if a function is defined. In FIG. 2, the name area 401 is indicated by "pname".

If the symbol defines a simple variable, the variable definition area 402 stores the value thereof, whereas if a list variable is defined, a value pointing to the list is stored. In FIG. 2, the variable definition area 402 is indicated by "value".

If the symbol defines a function, the function definition area 403 stores the function itself. In FIG. 3, the function definition area 403 is indicated by "function".

The security attribute area 404 stores information related to a security attribute for that symbol. The security attribute may be a read variable attribute, a change variable attribute, or an execute function attribute, for example. The security attribute area 404 stores an access flag that indicates access rights to that symbol, and a value that points to a table storing an authentication key for accessing that symbol.

In addition to the symbol 400 illustrated in FIG. 2, cells called cons cells for constructing a list structure are consecutively defined. FIG. 3 is an explanatory diagram illustrating an exemplary configuration of a cons cell 410 for constructing a list structure. As illustrated in FIG. 3, the cons cell 410 is an object made up of two pointers called a car slot 411 and a cdr slot 412. FIG. 3 illustrates car0 to car9 as the car slot 411, and cdr0 to cdr9 as the cdr slot 412. Obviously, the numbers of respective slots are not limited to such an example.

Figure 4:
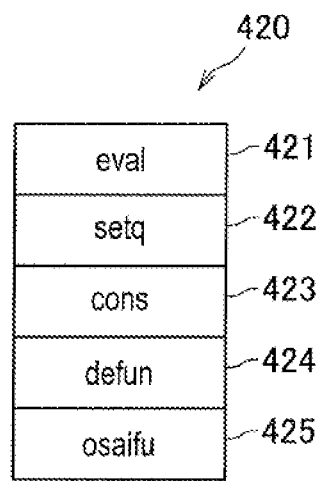
FIG. 4 is an explanatory diagram illustrating an exemplary structure of a computer program executed by an information processing device 100 according to an embodiment of the present invention.

A table for storing a name stored in the name area 401 of the symbol 400 is also provided. FIG. 4 is an explanatory diagram illustrating an exemplary structure of a name storage table 420 for storing a name stored in the name area 401 of the symbol 400. In the name storage table 420 illustrated in FIG. 4, the names "eval", "setq", "cons", "defun", and "osaifu" are stored, and exist in a 1-to-1 correspondence with their actual symbols. The sign 421 is an area storing the name "eval", the sign 422 is an area storing the name "setq", the sign 423 is an area storing the name "cons", the sign 424 is an area storing the name "defun", and the sign 425 is an area storing the name "osaifu". If a symbol name from outside the name storage table 420 is input into the name storage table 420, the symbol corresponding to the input symbol name stored in the name storage table 420 is pointed to and evaluated. Note that "osaifu" is taken to be a variable indicating a electronic money balance in the case in which an electronic money function is installed on the information processing device 100.

Figure 5:
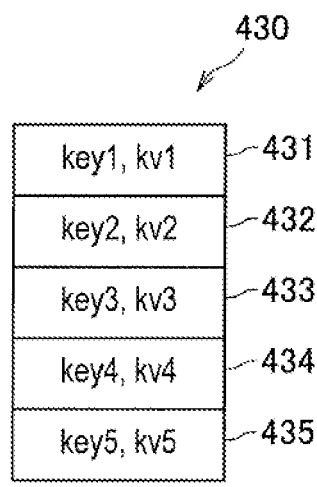
FIG. 5 is an explanatory diagram illustrating an exemplary structure of a computer program executed by an information processing device 100 according to an embodiment of the present invention.

Additionally, there is provided a table corresponding to a value which is stored in the security attribute area 404 of the symbol 400 and which points to a table storing an authentication key. FIG. 5 is an explanatory diagram illustrating an exemplary structure of an authentication key table 430 that stores an authentication key. FIG. 5 illustrates a state in which authentication keys are managed by version numbers (kv1 to kv5) in the authentication key table 430. The sign 431 is an area storing the key "key1", the sign 432 is an area storing the key "key2", the sign 433 is an area storing the key "key3", the sign 434 is an area storing the key "key4", and the sign 435 is an area storing the key "key5".

Figure 6:
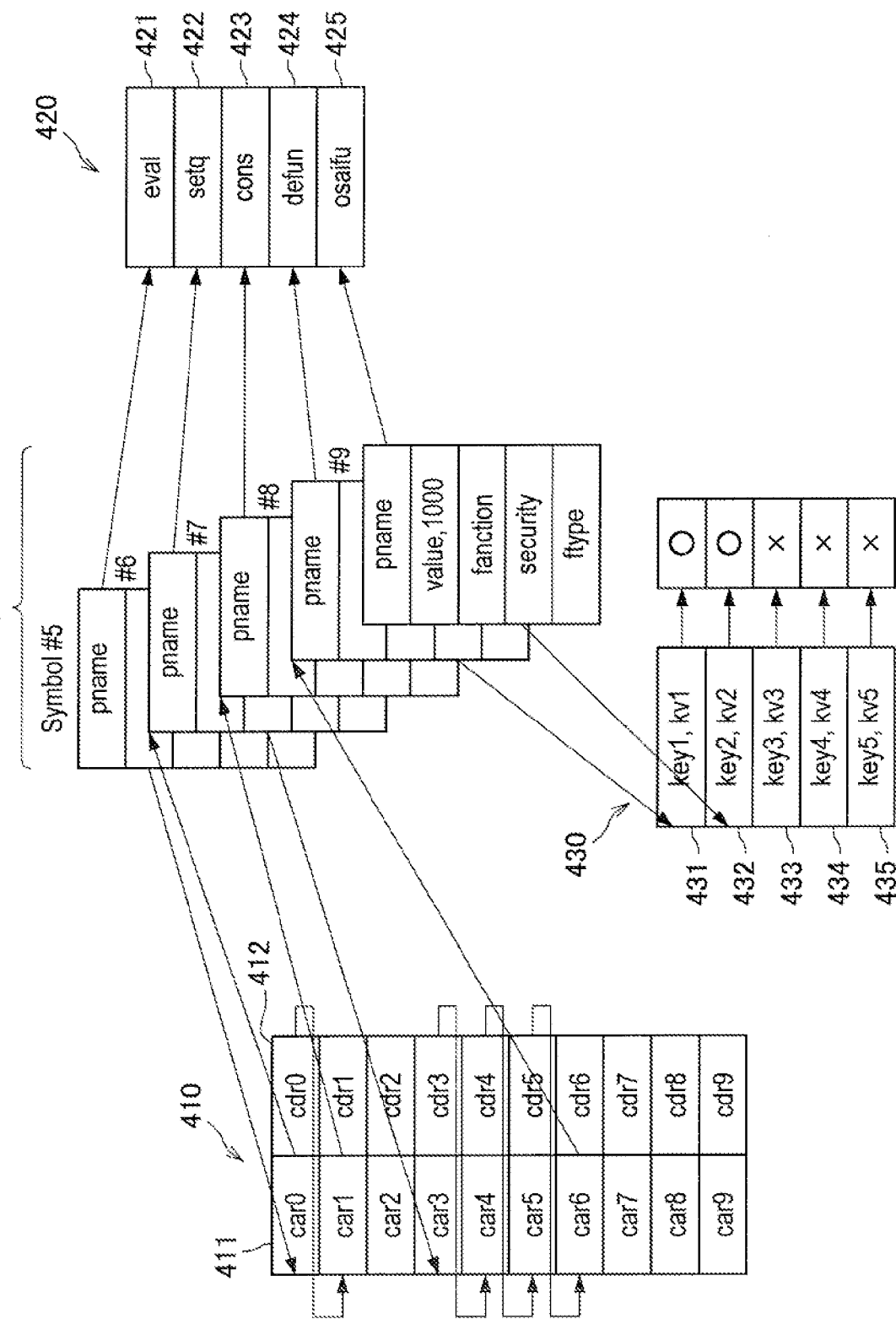
FIG. 6 is an explanatory diagram illustrating correspondence relationships among the symbols illustrated in FIG. 2, the cons cells illustrated in FIG. 3, the name storage table illustrated in FIG. 4, and the authentication key table illustrated in FIG. 5.

FIG. 6 is an explanatory diagram illustrating correspondence relationships among the symbols illustrated in FIG. 2, the cons cells illustrated in FIG. 3, the name storage table illustrated in FIG. 4, and the authentication key table illustrated in FIG. 5. As discussed earlier, a symbol has an area that points to a table of a printable name, an area that points to a value or list of values, a function attribute, and a security attribute. The function attribute has a function type and a pointer that points to the function itself. The security attribute has a security flag, a key version, and pointers that point to keys. Note that FIG. 6 illustrates how the key "key1" indicated by the sign 431 and the key "key2" indicated by the sign 432 in the authentication key table 430 illustrated in FIG. 5 are used.

In this way, the general structure of a list processing module is called a symbol, and is made up of a pointer to a numerical value or a list holding numerical values, a pointer to a function if a function definition, and a pointer that points to a table storing a printable character string.

Furthermore, in the present embodiment, in addition to the above, a security attribute and pointers to a table holding two types of encryption key information are added to a symbol. The pointer to the first key indicates a master key, while the pointer to the other key indicates an access key (authentication key) for that symbol. In the case of changing the security attribute or the access key for the symbol, the master key indicates the key to be authenticated with by mutual authentication in advance. In the case in which the security flag set for that symbol is raised during content evaluation or content modification of the information held in the symbol, or function execution, authentication with the first key added to the symbol becomes a condition for using that symbol. In the case of changing the key for that symbol, the other key indicates a rights authentication key that checks the rights thereof. Modification of the access information must be done while authenticated with that rights authentication key.

In addition, there are two sets of pointers, called cons cells, that express a relationship between symbol and symbol, as illustrated in FIG. 3. Each pointer is structured to point to a cons cell that indicates a symbol or another symbol.

A built-in function is written to the ROM 130, and at the first power-on of the information processing device 100, the built-in function written to the ROM 130 is defined in a symbol created in the RAM 140. At subsequent power-ons, an already registered symbol is not initialized.

The above configuration is structured to function similarly even in the case of a user registering a new function.

The list processing module executed by the CPU 110 is configured to be able to freely register a symbol, and freely register a numerical value, list, or function in that symbol. Additionally, in order to apply a security function to a registered symbol, an encryption key and an access flag is registered in that symbol. In the list processing module executed by the CPU 110, an encryption key called a system key is initially set. A newly registered symbol may be set with a key unique to that symbol and an access flag only while in a mutually authenticated mode using that system key. In addition, a computer program executed by the list processing module executed by the CPU 110 is configured to be able to change the variables or function definitions used as long as the state is still a mutually authenticated mode using the system key.

When registering a function symbol, the list processing module executed by the CPU 110 is subject to a registration condition that all symbols used by that function are authenticated with all keys. Additionally, the list processing module is structured such that in the subsequent case of using that registered function, it is sufficient to be simply authenticated with that function execution key.

The foregoing thus describes a structure of a computer program executed by the information processing device 100 illustrated in FIG. 1. Next, a computer program executed by the information processing device 100 or 200 will be described in detail.

Figure 7:
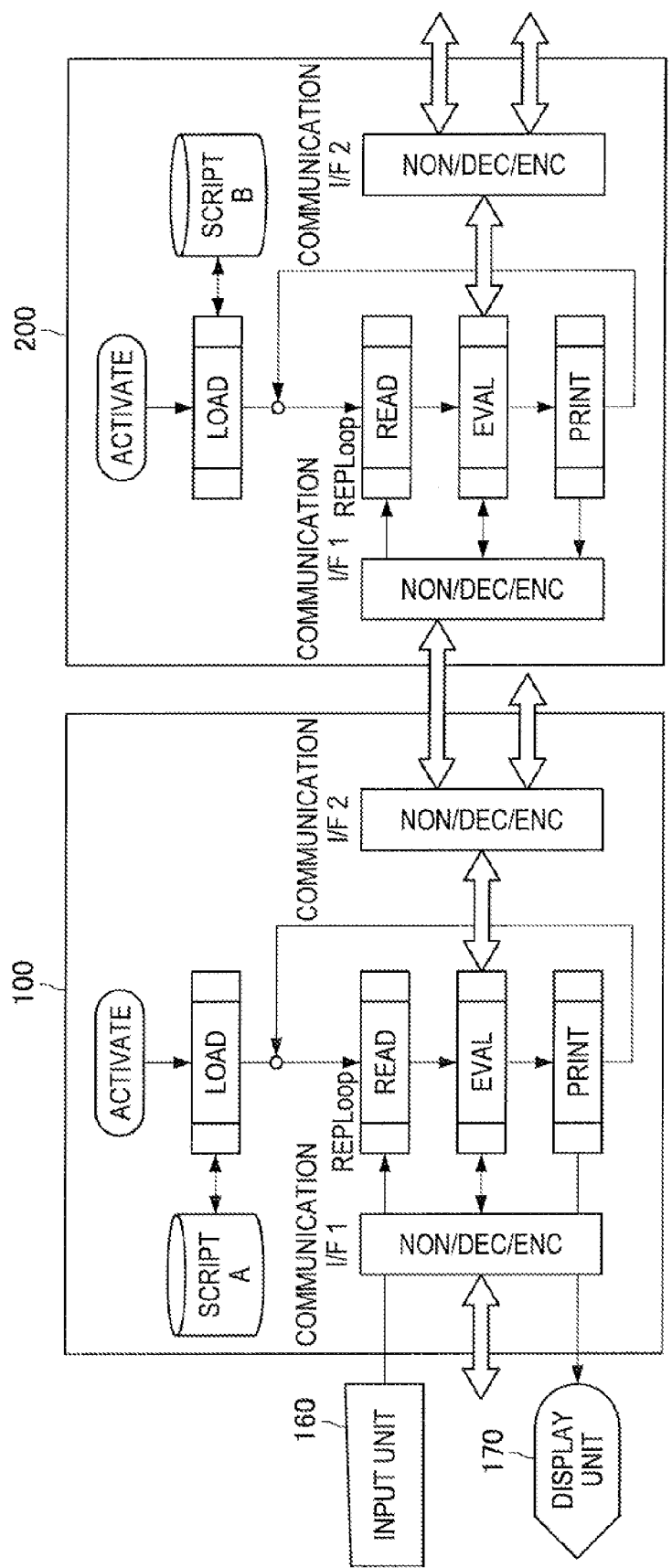
FIG. 7 is an explanatory diagram illustrating an overview of a computer program executed by an information processing device 100 or 200 according to an embodiment of the present disclosure.

FIG. 7 is an explanatory diagram illustrating an overview of a computer program executed by an information processing device 100 or 200 according to an embodiment of the present disclosure. Hereinafter, FIG. 7 will be used to describe an overview of a computer program executed by an information processing device 100 or 200 according to an embodiment of the present disclosure.

A sequential interpretation language has as an interactive mode a read-eval-print loop (REPL) called the top level. If an instruction is input from the display unit 170 connected to the information processing device 100, the instruction is read (read), evaluated (eval), and output (print) by this REPL.

In the present embodiment, a function input by the information processing device 100 outputs a script to the information processing device 200, receives an evaluation (eval) result on the information processing device 200, and outputs (print) as a result on the information processing device 100. In the case in which external equipment connected to the information processing device 200 provides similar sequential interpretation language input, this REPL is repeated.

Assume that a function or defined variable of a sequential interpretation language is structured having an access control flag as discussed earlier, for example, and that authentication is requested in the case of reading out a variable or function defined by external equipment, or changing the definition of a variable or function, for example. For example, in the case of attempting to execute a variable or function defined by a script B stored in the information processing device 200 with a sequential interpretation function module of the information processing device 100, assume that mutual authentication between the information processing device 100 and the information processing device 200 is requested. The reverse is also similar.

Assume that the information processing device 100 and the information processing device 200 have a similar structure, and that the communication I/F 1 switches between a local port and a network communication port, and has an authentication mode. FIG. 7 illustrates the information processing device 100 in a state of being connected to a local port, and the information processing device 200 in a state of being connected to a network communication port.

For example, the variable "osaifu" discussed earlier is a variable storing an electronic money balance, but in the case in which a script in which this variable is defined is saved on the information processing device 200, for example, if the sequential interpretation function module of the information processing device 100 attempts to reference this variable, the sequential interpretation function module of the information processing device 100 will be unable to reference this variable unless the information processing device 100 and the information processing device 200 are mutually authenticated.

The mode of the communication I/F 1 transitions from a mode 0 to a mode 1 upon success of a function "auth1" discussed later, and likewise transitions from mode 1 to a mode 2 upon success of a function "auth2" discussed later. Also, the communication I/F 2 transitions from a mode 0 to a mode 1 upon success of a function "ex-auth1" discussed later, and likewise transitions from mode 1 to a mode 2 upon success of a function "ex-auth2" discussed later. Herein, the function "auth1" is generated by the function "ex-auth1" by EVAL, and the function "auth2" is generated in the same way by the function "ex-auth2". The functions "auth1" and "auth2" are sent to the network communication port via the communication I/F 2.

The communication I/F 2 of the information processing device 100, after transitioning from mode 1 to mode 2 upon success of the function "ex-auth2", extends an encrypted communication session with the communication I/F 1 of the information processing device 200. After an encrypted communication session is extended between the communication I/F 2 of the information processing device 100 and the communication I/F 1 of the information processing device 200, transmitted messages sent by EVAL are encrypted, and received messages are decrypted. Similarly, if the communication I/F 2 of the information processing device 200 also goes to mode 2 upon success of the function "ex-auth2", an encrypted communication session is established with the communication I/F 2 of the information processing device 100. After an encrypted communication session with the communication I/F 2 of the information processing device 100 is established by the communication I/F 1 of the information processing device 200, by decrypting received messages and encrypting transmitted messages, encrypted communication with the communication I/F 2 of the information processing device 100 becomes possible.

In the present embodiment, the state of the communication I/F 1 being connected to a network as with the information processing device 200 is called minion mode. In minion mode, a script may be sent using a procedure function "request" from equipment in an ordinary mode (designated the normal mode), and equipment in normal mode is able to obtain a result from equipment in minion mode. Also, equipment switched to minion mode is accessible from any equipment via the network, rather than via a keyboard connected to the equipment. Consequently, minion mode restricts the behavior of a procedure function in the sequential interpretation function mode.

The communication I/Fs 1 and 2 communicate with each other in plaintext during authentication modes 0 and 1, but after switching to authentication mode 2, random numbers obtained by exchange by mutual authentication are used for encrypted communication, with one being used as a session key, and another being used as an initial value. Note that the authentication scheme uses a scheme that utilizes the above configuration to authenticate multiple symbols at the same time.

The data structure defines a structure with 16 bytes to a block, for example. Data input is expressed as "#_nnnn . . . " in hexa input, for example, and as "#~nnnn . . . " in the case of base64.

A 3-bit security flag is added to a symbol, for example, and restricts the functionality of the functions eval, mod, and exe. Additionally, the above 16-byte block data is treated as an authentication key, and pointer data to that key is added to the symbol.

Assume that the authentication condition is that for a security-locked variable, function usage, or evaluation, each symbol must be in mode 2 by internal mutual authentication (auth1, auth2), or mode 1 by external authentication (ex-auth1).

Assume that the functionality restriction for a standard command prevents execution unless the global variables and functions used by a function defined by a "define" function are already defined and have already passed required authentication. Also, assume that using a function or variable in a security-locked argument is unavailable unless that variable is already authenticated. In the case of traversing network communication, assume that in order to use the "define" function at the top level, the mode of the communication I/F 1 must be mode 2. Assume that a function or variable set with the security flag is unavailable unless already authenticated at the time of execution or evaluation.

In the present embodiment, function commands related to the execution of a script across devices are defined as follows, for example. Obviously, the names and functionality of the commands are not limited to that indicated below.

undef: Delete a function or variable defined by the "define" function start-minion: Connect a socket of a specific net address port as the Read input and Print output of a script conn-minion: Connect a port of a specific net address to a communication socket of other equipment request: Transmit a script to equipment in minion mode, and receive the result
setsym: Add a security attribute to a symbol
auth1: Authenticate using an authentication key belonging to a symbol, and a message code from a random number
auth2: Exchange data again and mutually authenticate on the basis of data exchanged by "auth1"
ex-auth1: Generate "auth1" function, transmit to equipment in minion mode, receive/analyze the result, and store internally
ex-auth2: Using content received and analyzed by "ex-auth1" command, additionally generate m4 and incorporate into "auth2" command, and transmit to equipment in minion mode
backup: write loaded and defined variables, functions, and security attributes to file as an initialization file Assume that the functionality restriction on functions is such that usage of the above functions "ex-auth1" and "ex-auth2" requires authentication by the system key in minion mode. Note that in the case of normal mode, assume that authentication is not required when using the functions "ex-auth1" and "ex-auth2". By restricting usage of the functions "ex-auth1" and "ex-auth2" in this way, it is possible to prevent unauthorized authentication using a key set externally via the network.

Also, assume that usage of the function "load" requires authentication by the system key in normal mode. Note that in the case of normal mode, assume that authentication is not required when using the function "load". By restricting usage of the function "load" in this way, it is possible to prevent unauthorized modification according to another, external initialization file via the network.

Also, assume that usage of the function "backup" requires authentication by the system key in normal mode. By restricting usage of the function "backup" in this way, it is possible to prevent authorized remote backup.

Assume that the file usage restriction is such that an initialization file loaded with the function "load" remains locked during execution of the list processing module. As a result, it is possible to prevent the same initialization file from being loaded from multiple modules and the content becoming contested due to being modified.

In an information processing device incorporating an execution module according to the present embodiment, in the case in which two or more external connection ports for connecting to external equipment exist, one port may be assumed to be a security card holding an authentication key, while the other port may be assumed to lead to external equipment that controls while conducting encrypted communication using functions authenticated by the security card, for example. In this way, in an information processing device incorporating an execution module according to the present embodiment, even in the case in which two or more external connection ports for connecting to external equipment exist, it is still possible to eliminate the risk of an authentication key being exposed externally.

Figure 8:
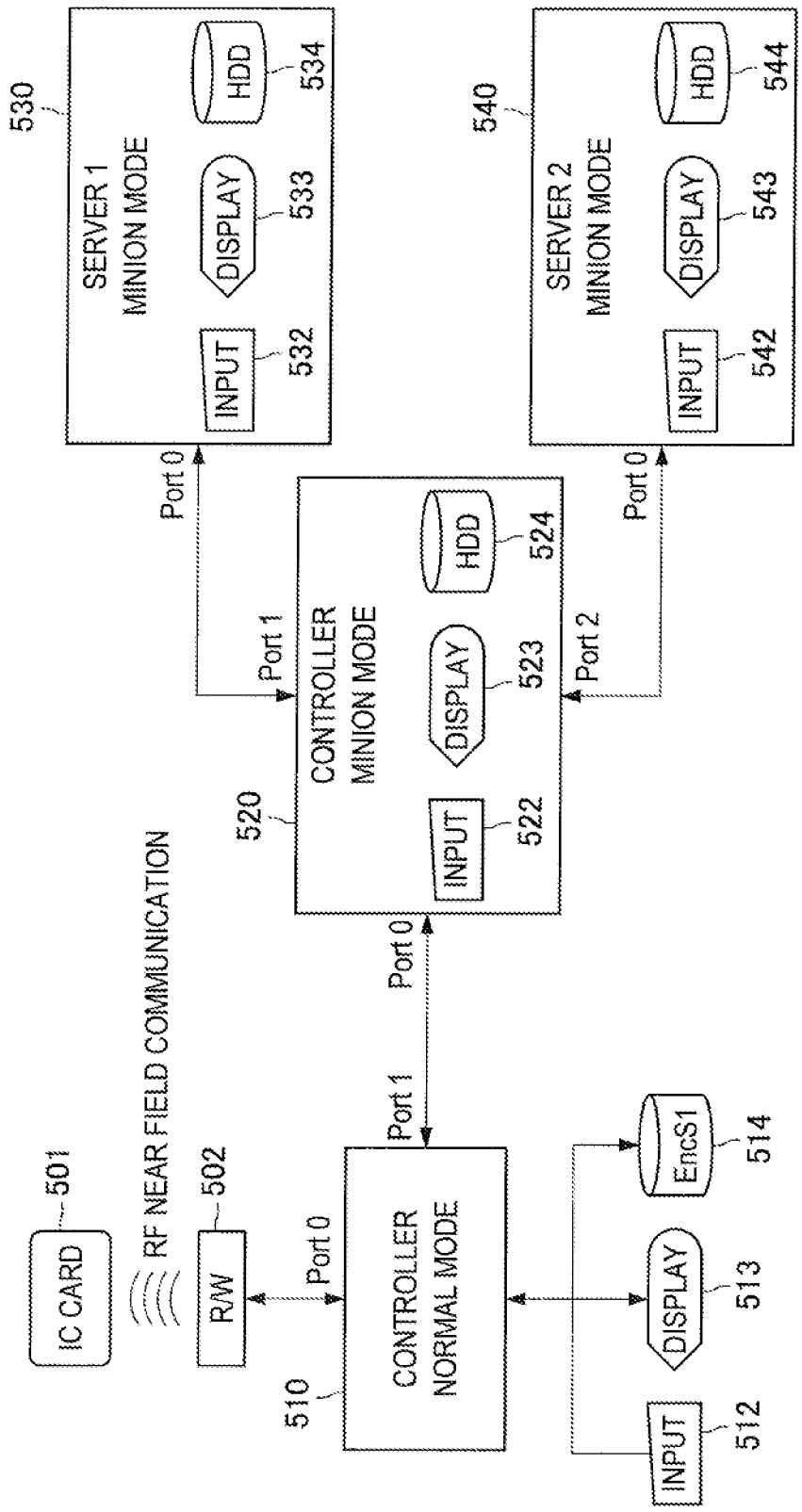
FIG. 8 is an explanatory diagram illustrating an exemplary configuration of equipment incorporating sequential execution data processing modules according to an embodiment of the present disclosure.

FIG. 8 is an explanatory diagram illustrating an exemplary configuration of equipment incorporating sequential execution data processing modules according to an embodiment of the present disclosure. FIG. 8 illustrates an IC card 501, a reader/writer (R/W) 502, controllers 510 and 520, and servers 530 and 540.

The IC card 501 executes RF near field communication with the reader/writer (R/W) 502. A sequential execution data processing module with limited resources is installed in internal memory (not illustrated) of the IC card 501. For example, if the IC card 501 is an IC card with electronic money functionality, an electronic money program and an operating key for executing the program are configured in the internal memory.

The reader/writer (R/W) 502 is connected to the controller 510, and executes RF near field communication with the IC card 501. A sequential execution data processing module is installed in the controller 510 connected to the reader/writer (R/W) 502, and the controller 510 holds a key that operates variables and functions defined in the program configured in the IC card 501, and a processing history of the IC card 501.

The controller 510 controls the operation of the reader/writer (R/W) 502. An input unit 512, a display unit 513, and an HDD 514 are connected to the controller 510. A sequential execution data processing module is installed in the controller 510, and functionality that initializes and activates the reader/writer (R/W) 502, as well as uploads electronic money processing records saved in the reader/writer (R/W) 502 to the controller 510, is configured by a script language.

The controller 510 includes two or more communication ports. FIG. 8 illustrates a state in which a port 0 is connected to the reader/writer (R/W) 502 and a port 1 is connected to the controller 520, respectively. The controller 510 becomes the initiator with the reader/writer (R/W) 502 as the target, while the reader/writer (R/W) 502 functions as the initiator in RF near field communication, and the IC card 501 at the other end of the connection becomes the target.

As illustrated in FIG. 8, the controller 520 is equipped with an input unit 522, a display unit 523, and an HDD 524. The controller 520 includes three or more communication ports. FIG. 8 illustrates a state in which a port 0 is connected to the controller 510, a port 1 is connected to the server 530, and a port 2 is connected to the server 540, respectively.

As illustrated in FIG. 8, the server 530 is equipped with an input unit 532, a display unit 533, and an HDD 534. Similarly, as illustrated in FIG. 8, the server 540 is equipped with an input unit 542, a display unit 543, and an HDD 544. The servers 530 and 540 respectively include one or more ports. FIG. 8 illustrates a state in which the respective ports 0 are connected to the controller 520.

FIG. 8 illustrates a state in which the controller 510 operates in normal mode, while the controller 520 and the servers 530 and 540 operate in minion mode. The controller 510 operates in normal mode while the controller 520 operates in minion mode, and if in a state in which mutual authentication has been completed between the controller 510 and the controller 520, it becomes possible for a function installed in the controller 520 to be executed from the controller 510, and for a script installed in the controller 520 to be modified from the controller 510.

Additionally, while in a state in which mutual authentication has been completed between the controller 510 and the controller 520, if additionally in a state in which mutual authentication has been completed between the controller 520 and the server 530, it becomes possible for a function installed in the server 530 to be executed from the controller 510, and for a script installed in the server 530 to be modified from the controller 510. Similarly, while in a state in which mutual authentication has been completed between the controller 510 and the controller 520, if additionally in a state in which mutual authentication has been completed between the controller 520 and the server 540, it becomes possible for a function installed in the server 540 to be executed from the controller 510, and for a script installed in the server 540 to be modified from the controller 510.

In this way, by conducting mutual authentication between equipment, it is possible to execute a script installed in equipment operating in minion mode from equipment operating in normal mode, and also to rewrite that script.

Figure 9:
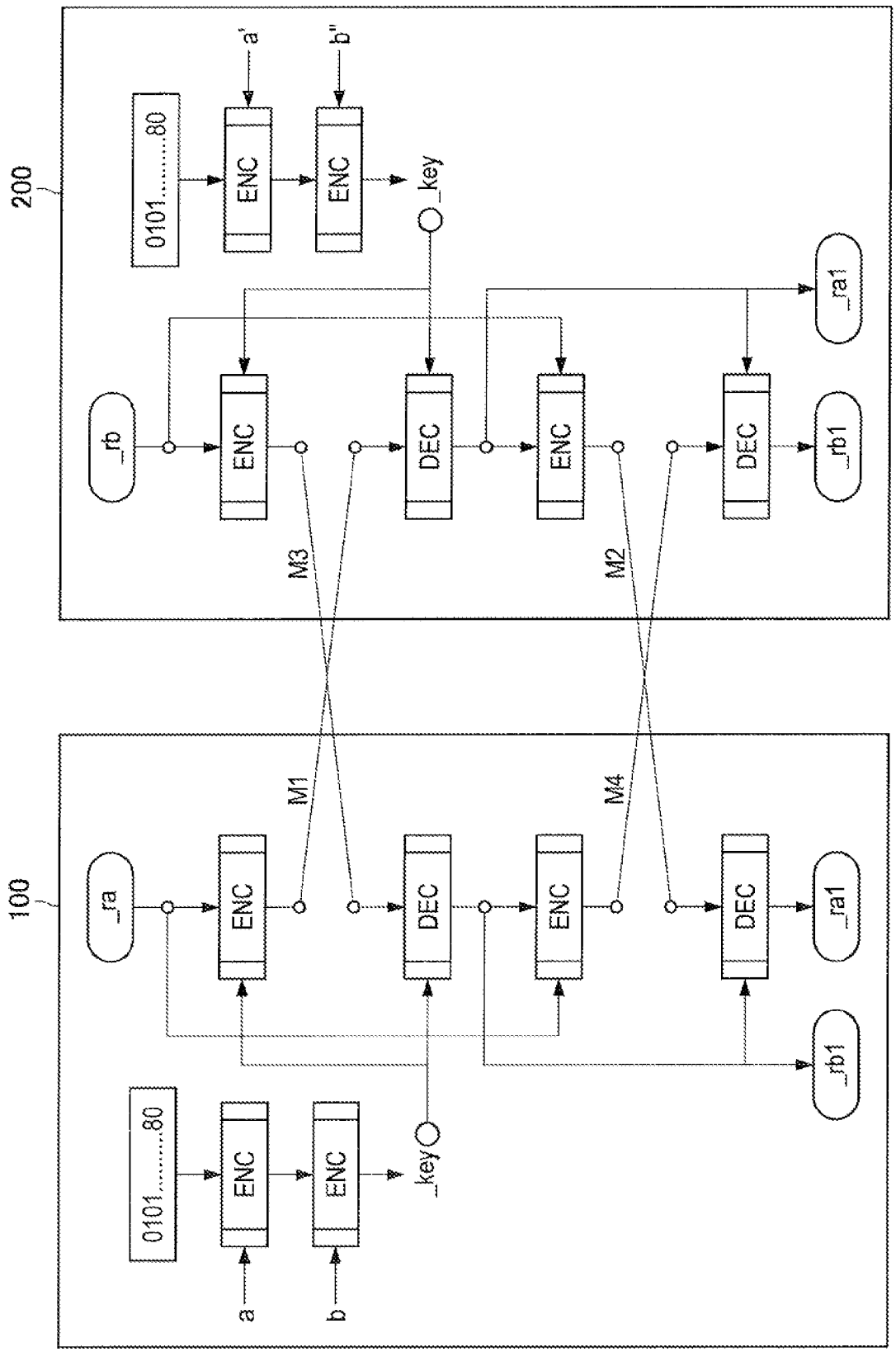
FIG. 9 is an explanatory diagram illustrating an example of a mutual authentication structure for mutual authentication between equipment.

FIG. 9 is an explanatory diagram illustrating an example of a mutual authentication structure for mutual authentication between equipment. FIG. 9 illustrates a mutual authentication structure during mutual authentication between the information processing device 100 and the information processing device 200. An example is illustrated in which the information processing device 100 and the information processing device 200 mutually authenticate each other by generating an encryption key on each of the information processing device 100 and the information processing device 200, and by mutually encrypting and decrypting with those encryption keys.

For example, data "_ra" in the information processing device 100 is encrypted with the encryption key of the information processing device 100 and sent to the information processing device 200, decrypted and retrieved with the encryption key of the information processing device 200, and in addition, re-encrypted with the encryption key of the information processing device 200 and sent to the information processing device 100. Similarly, data "_rb" in the information processing device 200 is encrypted with the encryption key of the information processing device 200 and sent to the information processing device 100, decrypted and retrieved with the encryption key of the information processing device 100, and in addition, re-encrypted with the encryption key of the information processing device 100 and sent to the information processing device 200.

The structure illustrated in FIG. 9 is configured to cause the information processing device 100 and the information processing device 200 to mutually authenticate each other by mutually encrypting and exchanging information respectively included in the information processing device 100 and the information processing device 200. Obviously, however, in the present disclosure, the structure of mutual authentication between equipment is not limited to such an example.

As a result of the same data processing module operating in separate equipment loading initialization files being stored in the respective equipment, internally stored variables and functions as well as authentication keys change. For this reason, the behavior changes in the individual equipment, and in addition, it becomes possible to separate rights so that even the execution of that defining function is made operable by being authenticated with a key held by another connected data processing module.

Figure 10:
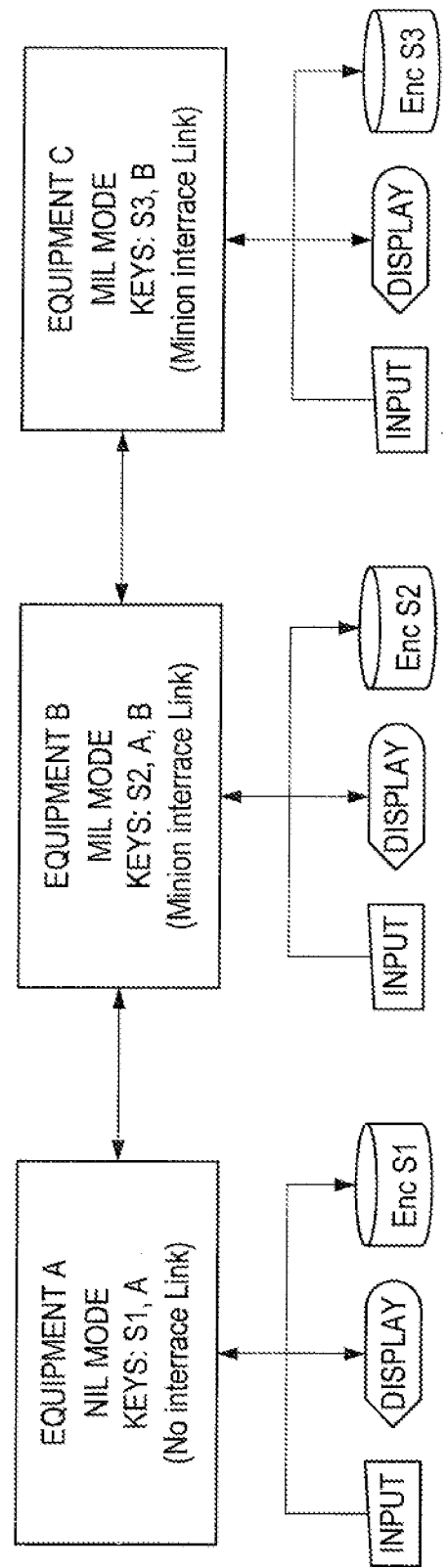
FIG. 10 is an explanatory diagram that conceptually illustrates linkage by the same sequential execution data processing module operating in separate equipment.

FIG. 10 is an explanatory diagram that conceptually illustrates linkage by the same data processing module operating in separate equipment. FIG. 10 illustrates three pieces of equipment A, B, and C, which are linked by data processing modules operating in each of the equipment A, B, and C.

The equipment A operates in a mode designated a "no interact link" (NIL) mode. This mode internally evaluates and processes input from a keyboard, and outputs the result to a display device. The equipment A operates in NIL mode by not particularly specifying anything during activation, and in the case of wanting to link with the equipment B, connects to the equipment B by specifying an address and port of the equipment B.

The equipment A uses a key S1 to decrypt and load an executable program from a hard disk. Subsequently, when connecting to the equipment B to use a script in the equipment B, the equipment A authenticates with the equipment B using a key A, and sends a program execution instruction to the equipment B. After authentication with the equipment B completes, the equipment A is able to freely execute variable definition and function definition at the top level.

The equipment B and the equipment C operate in a mode designated a "minion interact link" (MIL) mode. This mode specifies an address and port connected as a server during activation, and connects and authenticates with other equipment according to a client instruction. In MIL mode, input from the client is evaluated and processed by an internal data processing module, and the result is returned to the client. Provided input/output devices are used to input and output programs internally installed in the device itself.

The equipment B uses a key S2 to decrypt and load an executable program from a hard disk. Subsequently, the equipment B authenticates with the equipment A using the key A, and after authentication completes, allows a program execution instruction from the equipment A.

The equipment C uses a key S3 to decrypt and load an executable program from a hard disk. The equipment B authenticates with the equipment C using the key B according to an instruction from the equipment A, and the equipment C sends a program execution instruction to the equipment B. After the equipment A and the equipment B are mutually authenticated, and the equipment B and the equipment C are mutually authenticated, the equipment A and the equipment C are treated as being mutually authenticated.

In the case of no mutual authentication, adding or modifying variable definitions and function definitions from connected equipment is restricted, but in a mutually authenticated encrypted communication mode, adding or modifying variable definitions and function definitions may be conducted.

Figure 11:
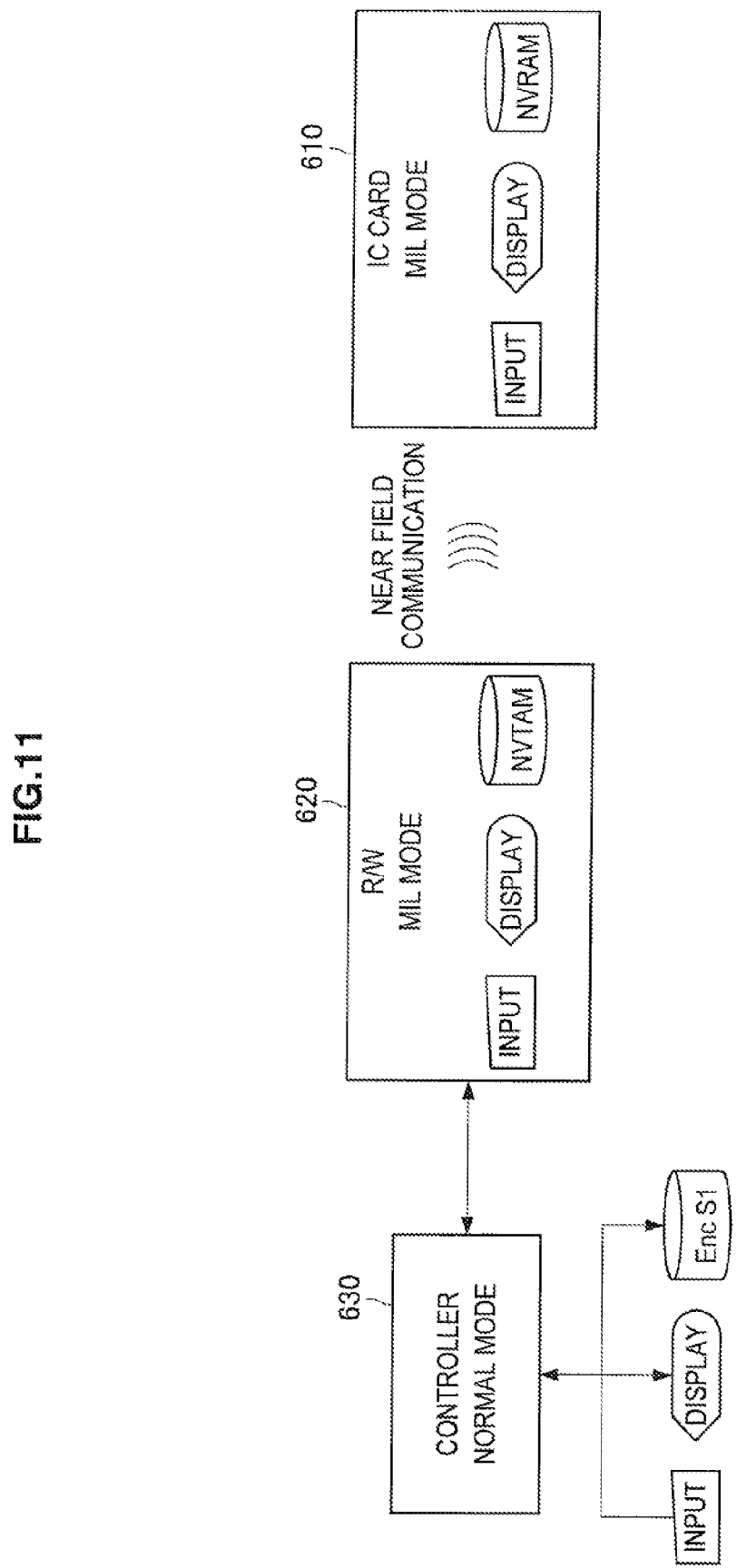
FIG. 11 is an explanatory diagram illustrating an exemplary configuration of equipment incorporating sequential execution data processing modules according to an embodiment of the present disclosure.

FIG. 11 is an explanatory diagram illustrating an exemplary configuration of equipment incorporating sequential execution data processing modules according to an embodiment of the present disclosure. FIG. 11 illustrates an IC card 610, a reader/writer (R/W) 620, and a controller 630. A key S1 for mutually authenticating with the reader/writer (R/W) 620 is stored in the controller 630.

Among the respective equipment illustrated in FIG. 11, the controller 630 operates in NIL mode, while the IC card 610 and the reader/writer (R/W) 620 operate in MIL mode. In this case, if the controller 630 and the reader/writer (R/W) 620 are mutually authenticated with the key S1, the controller 630 is able to cause a sequential execution data processing module installed in the reader/writer (R/W) 620 to execute a script installed in the reader/writer (R/W) 620, and also add or modify variable definitions and function definitions in a script installed in the reader/writer (R/W) 620. The above script may be a script for realizing an electronic money system that uses electronic money to pay for goods, for example.

In addition, if the controller 630 and the reader/writer (R/W) 620 are mutually authenticated with the key S1, and the reader/writer (R/W) 620 and the IC card 610 are mutually authenticated, the controller 630 is able to cause a sequential execution data processing module installed in the IC card 610 to execute a script installed in the IC card 610, and also add or modify variable definitions and function definitions in a script installed in the IC card 610.

Use Case Examples

A sequential execution data processing module executed by an information processing device 100 according to an embodiment of the present disclosure may be applied to uses like the following. Obviously, exemplary applications of a sequential execution data processing module executed by an information processing device 100 according to an embodiment of the present disclosure are not limited to those indicated below.

Secure Multi-Wireless Router Usage

By installing the present functionality into a wireless router that connects respective equipment to each other and into the connected equipment, it becomes possible to construct a mechanism that dynamically modifies connection conditions according to a script program that manages connections by the router, and assumes responsibility for authentication even between connected equipment lacking a common authentication key.

Electronic Money and Server

Payment is conducted by installing a sequential execution data processing module into an IC card used for electronic money, as well as installing a similar mechanism in a server that authenticates with that IC card.

IC Card with Display Device

The display of internal data in the IC card and an input process using a keypad are controlled by a script loaded by the sequential execution data processing module.

Cloud Server and Client Device

By installing a sequential execution data processing module into a cloud server and a client device, conducting server authentication from the client and to load a script program, and uploading a program to the cloud server, it is possible to safely run a program.

Trusted Link

A sequential execution data processing module is installed in each of multiple devices (assume a client A, a server B, a server C, and a client D, for example), and a session is extended using authentication keys respectively exchanged between each pair of devices, thereby realizing a mechanism enabling the clients to securely communicate. For example, by extending a session by exchanging authentication keys between the client A and the server B, the server B and the server C, and the server C and the client D, it is possible to enable the client A and the client D to securely communicate.

Scenario Base System

A complex system is realized by decomposing and assigning a scenario to actors configured as scripts by a sequential execution data processing module.

Secure Database

A database and a sequential execution data processing module are connected to realize dynamic database access control using a script.

Obviously, exemplary applications of a sequential execution data processing module executed by an information processing device 100 according to an embodiment of the present disclosure are not limited to those indicated above. In addition, rather than just linkage between equipment, similar operation may be realized by installing respective sequential execution data processing modules in separate areas (such as separate directories or separate folders) inside the same equipment.

3. Conclusion

According to the present disclosure as described above, there is provided a new sequential execution data processing module able to expand the functionality of a sequential execution data processing module, and execute a transaction with distributed responsibility by distributing the transaction across multiple modules via network communication standardized across the modules using the same protocol.

With a combination of executable code and an initialization file of the sequential execution data processing module, multiple secure databases with individual functionality may be configured, making it possible to communicate while mutually authenticating those databases, and also to safely install additional scripts in each database via that communication network.

An authentication key is also configured at the same time as adding an access control attribute to a variable or function, but once that authentication key has been configured for each module, when subsequently attempting to authenticate and use a variable or function, the variable or function becomes usable by authenticating with a module configured with another key. Since the authentication key itself no longer needs to be recorded elsewhere, the degree of safety increases.

A function built into the present module may be used without any restrictions in the case in which the input/output ports are a keyboard and display in interactive mode. However, usage via a communication port is restricted so that unauthorized script modification or deletion, initialization file modification, and the like are not possible. Thus, it is possible to guard against threats such as unauthorized alteration.

In the case of multiply linking the present module for encrypted communication, if a key known only to the connected modules is configured, that key is used to mutually authenticate, enabling communication through each encrypted communication session, and increasing the degree of freedom.

Note that the foregoing embodiment of the present disclosure illustrates an example in which the information processing device 100 and the information processing device 200 mutually authenticate each other, and a script being stored in one information processing device is read out and executing from the other information processing device. However, the present disclosure is not limited to such an example, and is also applicable to a case in which sequential execution data processing modules being stored in another area are mutually authenticated, and scripts being stored in separate areas (such as separate drives or separate directories) inside the same device are respectively read out and executed from a given sequential execution data processing module.

The foregoing thus describes preferred embodiments of the present disclosure in detail and with reference to the attached drawings. However, the present disclosure is not limited to such examples. It is clear to persons ordinarily skilled in the technical field to which the present disclosure belongs that various modifications or alterations may occur insofar as they are within the scope of the technical ideas stated in the claims, and it is to be understood that such modifications or alterations obviously belong to the technical scope of the present disclosure.

Additionally, the present technology may also be configured as below.

(1)

An information processing device including:

a first program execution unit that loads, interprets, and executes code of a computer program created by a procedural language, wherein the first program execution unit includes at least one port, and via this port, executes a second computer program created by a procedural language executed by a second program execution unit after authenticating with the second program execution unit.

(2)

The information processing device according to (1), wherein the first program execution unit includes a plurality of authentication modes, and wherein the first program execution unit, when executing a variable and function defined by a computer program, executes after authentication in authentication modes that differ between a case of executing according to an instruction from the device itself, and a case of being instructed to execute via the port from the other device.

(3)

The information processing device according to (1) or (2), wherein, in a case of the first program execution unit being mutually authenticated with the second program execution unit, when the second program execution unit is mutually authenticated with a third program execution unit, the first program execution unit may read out and execute code of a third computer program executed by the third program execution unit, without authenticating with the third program execution unit.

(4)

The information processing device according to any one of (1) to (3), wherein the first program execution unit authenticates through the port with the second program execution unit provided in the device itself.

(5)

The information processing device according to any one of (1) to (3), wherein the first program execution unit authenticates through the port with the second program execution unit provided in another device.

(6)

The information processing device according to any one of (1) to (5), wherein the computer program executed by the first program execution unit is a program of an electronic money system.

(7)

An information processing method including:

loading, interpreting, and executing code of a computer program created by a procedural language, by a first program execution unit that includes at least one port, wherein the executing executes, via the port and by the first program execution unit, a second computer program created by a procedural language executed by a second program execution unit after authenticating with the second program execution unit.

(8)

A computer program causing a computer to execute:

loading, interpreting, and executing code of a computer program created by a procedural language, by a first program execution unit that includes at least one port, wherein the executing executes, via the port and by the first program execution unit, a second computer program created by a procedural language executed by a second program execution unit after authenticating with the second program execution unit.

REFERENCE SIGNS LIST

100, 200 information processing device
110 CPU
120 encryption/decryption unit
130 ROM
140 RAM
150 NVRAM
160 input unit
170 display unit

The invention claimed is:

1. An information processing device to safely link separate, independently executed, sequential execution data processing modules, said information processing device comprising:

a hardware controller configured to have installed therein a first program execution unit to load, interpret, and execute code of a computer program created by a procedural language, wherein the first program execution unit includes a port, and is configured to execute, by way of the port, a second computer program created by a procedural language installed in a second program execution unit after authenticating with the second program execution unit, wherein the first program execution unit is further configured to execute code of a third computer program installed in a third program execution unit without being authenticated with the third program execution unit when (i) the first program execution unit is mutually authenticated with the second program execution unit and (ii) the second program execution unit is mutually authenticated with the third program execution unit, and wherein the first program execution unit includes a plurality of authentication modes that differ depending on whether the information processing device is (i) in a first connection state in which the information processing device is able to execute according to an instruction from the information processing device itself or (ii) in a second connection state in which the information processing device is being instructed to execute via the port from another device, and wherein the first program execution unit is configured to execute a variable or function defined by a computer program after successful authentication in an appropriate one of the authentication modes.

2. The information processing device according to claim 1, wherein the first program execution unit authenticates through the port with the second program execution unit provided in another device.

3. The information processing device according to claim 1, wherein the computer program executed by the first program execution unit is a program of an electronic money system.

4. An information processing method for use in an information processing device having a hardware controller and configured to safely link separate, independently executed, sequential execution data processing modules, said information processing device, said method comprising:

loading, interpreting, and executing code of a computer program created by a procedural language, by a first program execution unit that includes a port, said first program execution unit being installed in the controller, wherein the executing executes, via the port and by the first program execution unit, a second computer program created by a procedural language installed in a second program execution unit after authenticating with the second program execution unit; and executing code, by the first program execution unit, of a third computer program installed in a third program execution unit without being authenticated with the third program execution unit when (i) the first program execution unit is mutually authenticated with the second program execution unit and (ii) the second program execution unit is mutually authenticated with the third program execution unit, and wherein the first program execution unit includes a plurality of authentication modes that differ depending on whether the information processing device is (i) in a first connection state in which the information processing device is able to execute according to an instruction from the information processing device itself or (ii) in a second connection state in which the information processing device is being instructed to execute via the port from another device, and said method further comprising executing a variable or function defined by a computer program after successful authentication in an appropriate one of the authentication modes.

5. A non-transitory computer readable medium having stored thereon a computer program which when executed causes an information processing method to be performed by an information processing device having a hardware controller and configured to safely link separate, independently executed, sequential execution data processing modules, said information processing device, said method comprising:

loading, interpreting, and executing code of a computer program created by a procedural language, by a first program execution unit that includes a port, said first program execution unit being installed in the controller, wherein the executing executes, via the port and by the first program execution unit, a second computer program created by a procedural language installed in a second program execution unit after authenticating with the second program execution unit, and executing code, by the first program execution unit, of a third computer program installed in a third program execution unit without being authenticated with the third program execution unit when (i) the first program execution unit is mutually authenticated with the second program execution unit and (ii) the second program execution unit is mutually authenticated with the third program execution unit, and wherein the first program execution unit includes a plurality of authentication modes that differ depending on whether the information processing device is (i) in a first connection state in which the information processing device is able to execute according to an instruction from the information processing device itself or (ii) in a second connection state in which the information processing device is being instructed to execute via the port from another device, and said method further comprising executing a variable or function defined by a computer program after successful authentication in an appropriate one of the authentication modes.

* * * * *